United States Patent [19]

Aucktor et al.

[11] Patent Number: 5,122,096
[45] Date of Patent: Jun. 16, 1992

[54] CONSTANT VELOCITY RATIO UNIVERSAL JOINT

[75] Inventors: Erich Aucktor, Offenbach am Main; Werner Jacob, Frankfurt am Main, both of Fed. Rep. of Germany

[73] Assignee: Löhr & Bromkamp Gmbh, Offenbach am Main, Fed. Rep. of Germany

[21] Appl. No.: 621,029

[22] Filed: Nov. 30, 1990

[30] Foreign Application Priority Data

Nov. 30, 1989 [DE] Fed. Rep. of Germany ....... 3939531

[51] Int. Cl.⁵ .............................................. F16D 3/34
[52] U.S. Cl. ..................................... 464/145; 464/906
[58] Field of Search ............................... 464/145, 906

[56] References Cited

U.S. PATENT DOCUMENTS

| | | | |
|---|---|---|---|
| 3,076,323 | 2/1963 | Aucktor | 464/145 |
| 3,668,893 | 6/1972 | Schmid | 464/145 |
| 4,494,941 | 1/1985 | Hirai et al. | 464/145 |
| 4,589,857 | 5/1986 | Okoshi | 464/145 |

FOREIGN PATENT DOCUMENTS

| | | | |
|---|---|---|---|
| 2252827 | 5/1974 | Fed. Rep. of Germany. | |
| 57-129926 | 8/1982 | Japan | 464/145 |

*Primary Examiner*—Daniel P. Stodola
*Assistant Examiner*—William G. Battista, Jr.
*Attorney, Agent, or Firm*—Akoo Toren

[57] ABSTRACT

A non-plunging constant velocity ratio universal joint comprising outer and inner joint members (1, 2) with groove pairs (7, 8) in meridian planes and a cage (13) having apertures wherein torque-transmitting balls (9) are received on in each facing pair of grooves, has groove center lines which comprise portions with centers of curvature ($M_{ag}$, $M_{ak}$, $M_{ig}$, $M_{ik}$) which, with the joint in the aligned position, are disposed symmetrically relative to each other on opposite sides of the joint center plane ($E_K$), and in the case of which the center lines of the grooves each comprise a portion with a narrower curvature on that side of the ball center plane ($E_K$) to which the respective offset line ($O_A$, $O_B$) of the joint member points, as well as a portion with a wider curvature on the side of the ball center plane ($E_K$) positioned opposite the respective offset line of the joint member.

16 Claims, 2 Drawing Sheets

CONSTANT VELOCITY RATIO UNIVERSAL JOINT

BACKGROUND TO THE INVENTION

1. Field of the Invention

This invention relates to a constant velocity ratio universal joint of axially fixed (non-plunging) type, the joint comprising an outer joint member provided in its interior with a plurality of circumferentially spaced grooves extending as meridians about the axis of rotation of the outer joint member, an inner joint member disposed inside the outer joint member and provided on its exterior with grooves extending as meridians about the axis of rotation of the inner joint member, facing the grooves in the outer joint member in pairs, a plurality of balls disposed one in each facing pair of grooves in the joint members for torque transmission therebetween, and a cage of annular form disposed between the inner and outer joint members and having windows wherein the balls are received, to hold the balls with their centres in a plane, the centre lines of the grooves of at least some of the pairs thereof comprising at least two portions of different curvature as viewed in planes containing the axes of rotation of the joint members, with centres of curvature positioned symmetrically relative to each other on opposite sides of the ball centre plane when the joint is aligned.

Such fixed joints are commonly used at the outboard ends of the drive shafts of front wheel drive vehicles. Such joints have to be able to transmit high torques, and operate at large angles of articulation.

2. Description of Prior Art

GB 810 289 discloses a form of constant velocity ratio fixed universal joint wherein the grooves of each pair comprise arcuate centre lines whose centres of curvature are offset by equal amounts relative to the ball centre plane. A disadvantage of such joints is that towards the end of each groove the groove depth decreases, which limits the torque which can be transmitted when the joint is articulated to its maximum permitted angle. At maximum articulation, the large control angle (defined between the tangents to the balls and grooves at the points of contact therebetween) causes high axial forces to act on the cage. This may lead to overloading of the cage when the joint is subject to high loads at high articulation angles, e.g. when starting the vehicle on a hill or when trying to free a vehicle which has become stuck with the steering wheel on lock. Such overloading may possibly lead to jamming of the joint or even breakage thereof.

A further example of a fixed constant velocity ratio universal joint is disclosed in DE 37 00 868, wherein only half the pairs of groove are configured to provide a control angle as above referred to, by axially offsetting the centres of curvature of the arcuate centre lines of the grooves relative to the ball centre plane. The other groove pairs have the centre lines of the grooves concentric, which grooves, because of their uniform depth, are able to accommodate unchanged torque when the joint is articulated. From the point of view of production, providing two different types of groove is too expensive, particularly for mass produced joints for application in motor vehicles.

A further inadequacy of the joints above referred to is that the balls move radially relative to the cage through relatively long distances. The cage must therefore be relatively thick, as a result of which the usable groove depth in the joint members is reduced and thus the torque which is able to be transmitted is further reduced. This can lead to fracture of the windows in the cage when fitting the balls.

A further type of joint of the kind first referred to is disclosed in DE 22 52 827, wherein the grooves have centre lines which comprise arcuate portions followed by tangentially extending straight lines. The centres of curvature of the arcuate portions of the grooves in each pair are offset by equal amounts on opposite sides of the ball centre plane when the joint is in the aligned (non-articulated) condition. The centres of curvature do not lie on the axes of rotation of the joint members. At maximum joint articulation, however, the above referred to disadvantages of reduced groove depth are even more significant. The large control angles which exist in the grooves whose centre lines lie in the plane of joint articulation when the joint is articulated to its maximum angle are not necessary for control of the joint, which control function is taken over by the grooves which cross one another in the plane perpendicular to the articulation plane. Axial forces acting on the cage disadvantageously generate increased friction and ball loads, with increased risk of joint fracture.

SUMMARY OF THE INVENTION

It is the object of the present invention to further develop a joint of the kind first referred to, in such a way that the effective groove depth is increased even in the regions engaged by the balls at large angles of joint articulation, with the forces acting on the cage at such large articulation angles being considerably reduced.

According to the invention, we provide a non-plunging constant velocity ratio universal joint, comprising:

an outer joint member provided in its interior with a plurality of circumferentially spaced grooves extending as meridians about the axis of rotation of the outer joint member;

an inner joint member disposed inside the outer joint member and provided on its exterior with grooves extending as meridians about the axis of rotation of the inner joint member, facing the grooves in the outer joint member in pairs;

a plurality of balls disposed one in each facing pair of grooves in the joint members for torque transmission therebetween;

a cage of annular form disposed between the inner and outer joint members and having windows wherein the balls are received, the balls being held by the cage with their centres in a plane;

the centre lines of the grooves of at least some of the pairs thereof each comprising at least two portions of different curvature as viewed in planes containing the axes of rotation of the joint members, with the centres of curvature of the centre lines of the grooves in said pairs being positioned symmetrically relative to each other on opposite sides of the ball centre plane in the aligned joint;

the tangents to the centre lines of the grooves of each of said at least some pairs at the engagement thereof by the ball received therein intersecting one another to define a control angle and the perpendicular lines to said tangents, in the aligned joint, extending to intersect the axis of the joint members to define offset lines each at an offset angle to the ball centre plane;

the centre lines of the grooves of said at least some pairs each comprising a portion of relatively smaller radius of curvature disposed at the side of the ball centre plane to which the respective offset line extends, and a portion of relatively larger radius of curvature than the first said portion disposed at the side of the ball centre plane opposite that to which the respective offset line extends.

Some features of a universal joint according to the invention which, if provided, are particularly advantageous are as follows:

The centres of curvature of each of the grooves may be positioned on said offset lines, as determined by the offset angle when the joint is in the aligned condition.

The centres of curvature of the groove portions of larger and smaller radii of curvature may be positioned away from the axes of the joint members, with the larger radius of curvature being greater than the pitch circle radius of the balls in the aligned joint and preferably two to three times greater than the pitch circle radius; and the smaller radius of curvature being less than the pitch circle radius and preferably less than or equal to ⅔ said pitch circle radius. Preferably the control angle is at its highest value when the joint is in the aligned condition, and decreases as the joint articulates to an increasing angle of articulation, for a groove pair whose centre lines lie in the plane of joint articulation, i.e. the plane containing the axes of both joint members.

The groove design according to the invention ensures a reduced radial movement of the balls relative to the cage, combined with an improved groove depth in the entire range of joint articulation. In addition, the axial forces acting on the cage are reduced as a result of the reduced control angle at larger angles of joint articulation. Up to an articulation angle of 80°, required for assembly of the joint, the radial travel of the balls should only be 4% of their pitch circle diameter. In this way, it is possible to provide a joint whose torque transmitting capacity is increased over the entire articulation range without causing substantial increases in production costs as compared to prior art joints. The friction forces acting on the cage in the critical load phase at large articulation angles are reduced, and edge fracture at the cage windows during joint assembly is avoided. In view of modern production control facilities, the provision of grooves whose shape includes different radii of curvature does not present a problem.

The depths of the grooves in the inner and outer joint members preferably are substantially the same and constant along their lengths, with the grooves' cross-sectional shape such that the distance between the contact points of the balls in the groove cross-section and the edges of the grooves also are substantially constant along the lengths of the grooves engaged as the joint articulates. Thus the elliptical pressure zones of contact of the balls and grooves do not move into the region of the edges of the grooves, avoiding fracture thereof.

The shape of the centre lines of the grooves may include a portion of mean radius of curvature engaged in the range of joint articulation up to 10° from the aligned condition, and wherein the control angle is 7° to 9°. The centre of curvature of such groove portion may lie on the axis of rotation of the joint. End portions of the grooves have their centres of curvature positioned away from the axis of rotation of the joint, with the control angle decreasing to 0° with an increasing articulation angle.

Preferably the centre of curvature of the centre line of the groove portion of smaller radius of curvature is offset from the joint axis towards the groove, and the centre of curvature of the portion of larger radius of curvature is offset from the joint axis away from the groove. In this way it is possible to achieve the required substantially uniform groove depth.

Preferably the control angle reaches the value of 0° when the joint is articulated to an angle in excess of 20°. In this way, the axial forces on the cage are eliminated altogether beyond this value of articulation. The transition to a control angle of 0° is preferably achieved for an angle of articulation in the range 30° to 60°, but the groove angles do not necessarily have to be symmetrical relative to the joint centre plane.

The control angle may vary asymmetrically or symmetrically as a function of the angle of articulation from the joint in opposite directions from the aligned condition.

BRIEF DESCRIPTION OF DRAWINGS

The invention will now be described by way of example with reference to the accompanying drawings, of which.

DESCRIPTION OF PREFERRED EMBODIMENTS

Figure 1:
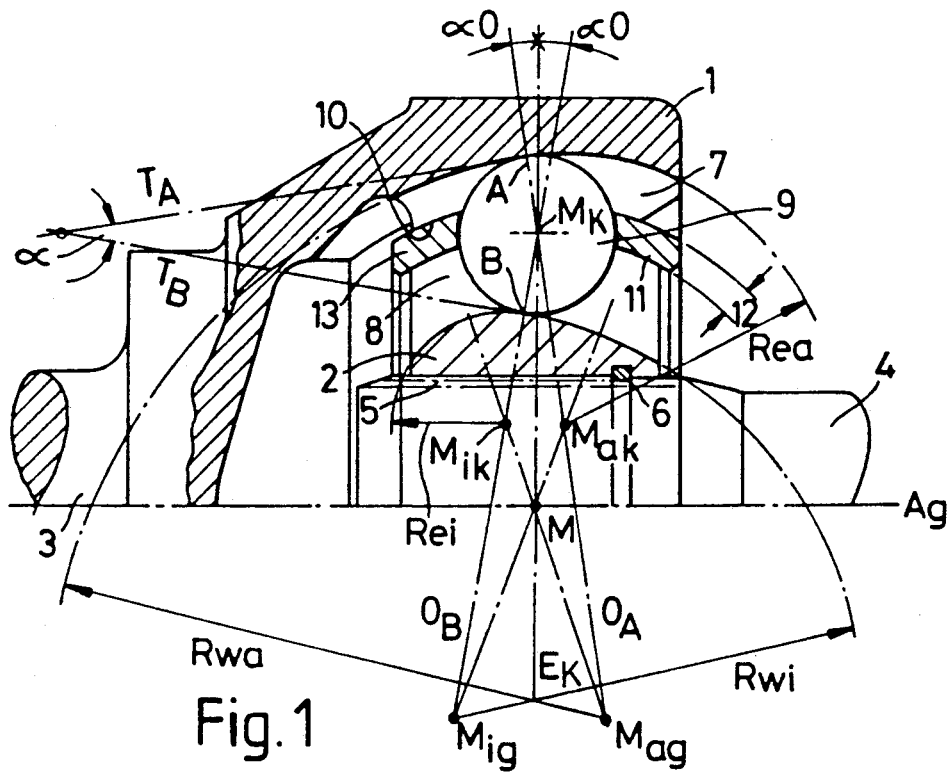
FIG. 1 is a longitudinal section through half a joint according to the invention, the joint being in the aligned (non-articulated) condition.

Referring firstly to FIG. 1 of the drawings, the illustrated joint comprises an outer joint member 1 and an inner joint member 2, the former being integral with a shaft part 3 and the latter being connected for torque transmission with a shaft part 4 by splines 5 and retained by a retaining ring 6. Each of the joint members is provided with circumferentially spaced grooves facing one another in pairs in which torque transmitting balls are received, one of the grooves in the outer joint member being shown at 7 and one of the grooves in the inner joint member being shown at 8 with a ball 9 received in the grooves 7, 8. Between the grooves, the outer and inner joint members have cage guiding faces 10, 11 respectively, with a cage 13 being guided therebetween, the cage having apertures wherein the balls 9 are received. The centres of curvature of the cage guiding faces 10, 11 both lie at the centre of articulation M of the joint, so that the cage has a constant wall thickness as indicated at 12. The cage holds the balls with their centres in a common plane $E_K$. The wall thickness of the cage forms a ratio with the pitch circle diameter of the balls in the aligned joint, that is no more than 1:18.

In the illustrated section, the ball 9 contacts the grooves 7, 8, on the centre lines thereof, at points A, B respectively. The tangents $T_A$ and $T_B$ to the ball and grooves at their contact points intersect to define a control angle $\alpha$. The straight lines $O_A$, $O_B$ perpendicular to the tangents $T_A$, $T_B$ at the contact points A and B in the aligned joint constitute the so-called offset lines, pointing towards the axis of rotation $A_g$ of the joint, and each extending at an offset angle $\alpha_O$ to the ball centre plane $E_K$. In the aligned joint, the control angle $\alpha$ is equal to twice the offset angle $\alpha_O$.

The shape of the groove 7 in the outer joint member comprises two arcuate portions with respective centres of curvature $M_{ag}$, $M_{ak}$. The portion of the groove 7 of smaller radius of curvature $R_{ea}$ (centre of curvature $M_{ak}$) lies to that side of the ball centre plane $E_K$ to which the offset line $O_A$ points, while the groove portion of larger radius $R_{wa}$ (centre of curvature $M_{ag}$) lies to the opposite side of the ball centre plane. Both the centres of curvature lie to one side of the ball centre plane $E_K$. Similarly the groove in the inner joint member comprises two arcuate portions, respectively of smaller and larger radius $R_{ei}$, $R_{wi}$ with centres of curvature $M_{ik}$ and $M_{ig}$ which lie on the opposite side of the ball centre plane $E_K$. All these centres of curvature lie on the offset lines $O_A$, $O_B$. The centres of curvature $M_{ak}$ and $M_{ik}$ of smaller radius are disposed to one side of the axis of rotation $A_G$ of the joint, while the centres of curvature $M_{ig}$, $M_{ag}$ of the larger radii of curvature are disposed on the opposite side of the axis $A_G$. The offset lines $O_A$, $O_B$ each lie at the offset angle $\alpha_O$ relative to the ball centre plane $E_K$. Preferably, and as illustrated, the centres of curvature $M_{ig}$ and $M_{ag}$ are arranged at the same distance as one another from the axis $A_G$, and the centres of curvature $M_{ik}$ and $M_{ak}$ of smaller radius are the same distance as one another from the axis $A_G$. All the centres of curvature and radii of curvature above referred to are related to the centre line of the base of the grooves; the same relationships apply to the path described by the centre $M_K$ of a ball 9 as it moves along the grooves, as such path is parallel to the base of each groove.

Figure 2:
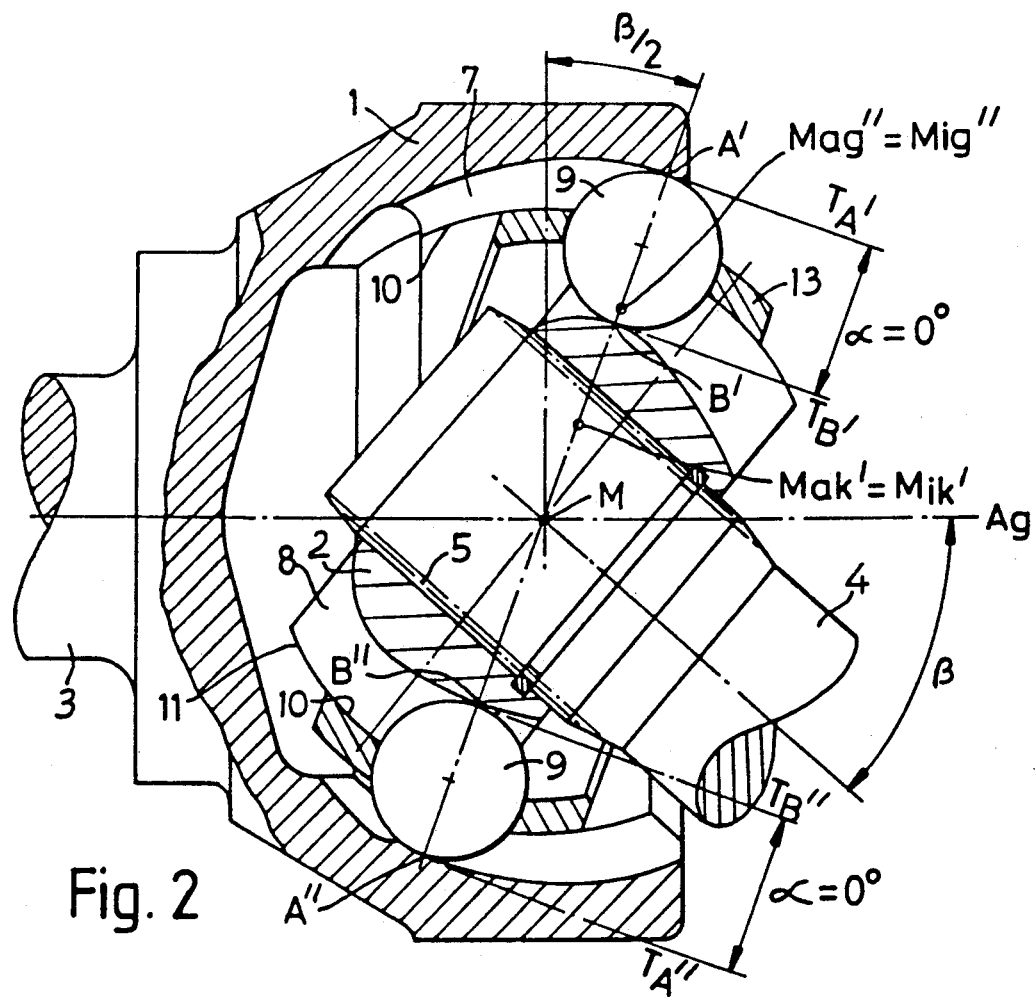
FIG. 2 is a section through the complete joint of FIG. 1, in the articulated condition and in the plane of joint articulation.

FIG. 2 illustrates the joint of FIG. 1 when it has been articulated through an angle $\beta$. In this condition, the ball centre plane has moved from its position through an angle $\beta/2$. The centre of curvature $M_{ik}$ has moved to position $M_{ik}'$ which lies on the straight line leading from the centre of curvature $M_{ig}$ to the contact point A' of the uppermost ball in the drawing with the groove in the outer joint member. In this condition, therefore, the tangents $T_A'$, $T_B'$ at the points of contact of this ball with the grooves in the outer joint member are parallel to one another, i.e. the control angle of the joint is 0°. Equally, the centre of curvature $M_{ig}$ of the part of the opposite groove in the inner joint member engaged by the opposite ball has moved to a position $M_{ig}''$ on the straight line connecting the center of curvature $M_{ag}''$ of the corresponding groove on the outer joint member and the contact point A" of the opposed ball, so that the tangents $T_A''$ and $T_B''$ at the contact points A" and B" are also parallel, so that the control angle at the opposite ball is also 0°.

Figures 3, 4:
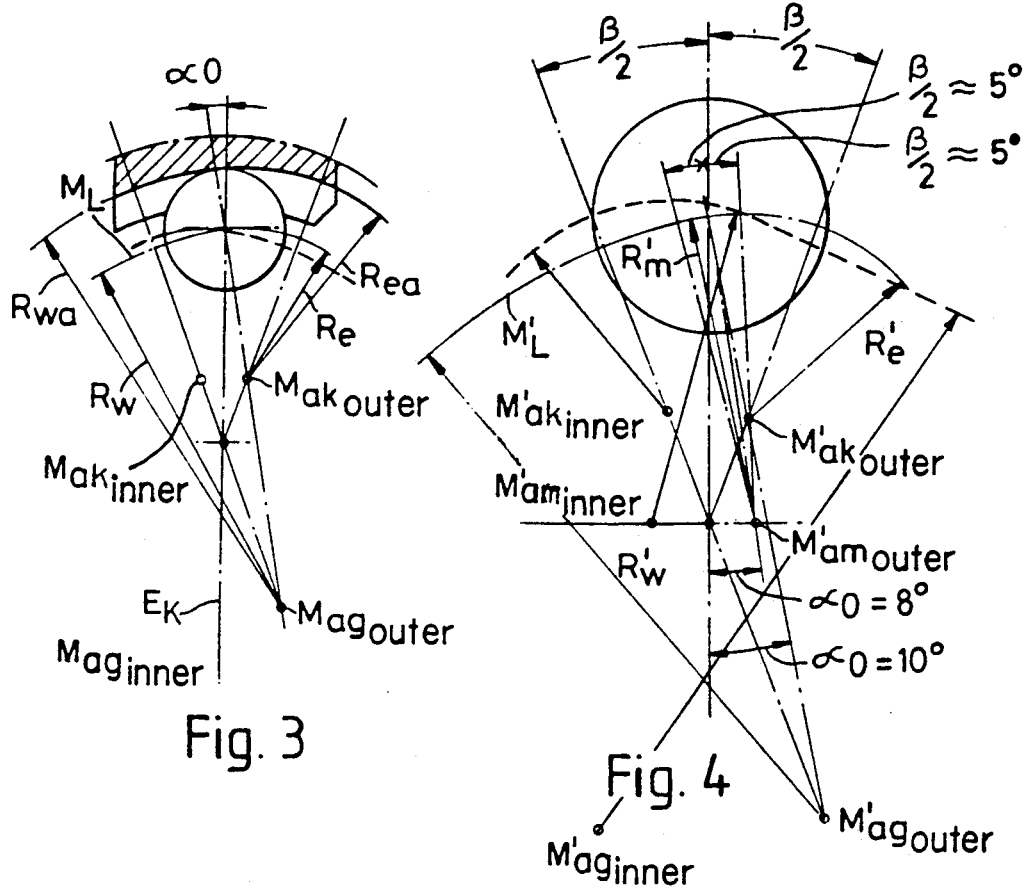
FIG. 3 illustrates the curvature of a groove of a joint according to the invention, comprising two arcuate portions.
FIG. 4 illustrates the curvature of a groove of a joint according to the invention, comprising three arcuate portions.

FIG. 3 illustrates the fact above pointed out, that the path described by the centre of a ball moving along the center line $M_L$ of a groove at the outer joint member has the same centres as curvature $M_{ag}$ and $M_{ak}$ as the groove base. $R_w$ and $R_e$ are the radii of curvature from the centres $M_{ag}$ and $M_{ak}$ to the line M, shown for comparison with the respective radii $R_{wa}$ and $R_{ea}$ to the base of the groove. Preferably, the above referred to relationships apply between the radii $R_w$ and $R_e$ and the pitch circle radius of the balls in the aligned joint.

FIG. 4 illustrates a ball of which the path described by its centre moving along the center line $M_L'$ of a groove of the outer joint member comprises three successive arcuate portions instead of the two arcuate portions above described. The first arcuate portion has a centre of curvature $M_{ag}'$ and the largest radius of curvature $R_w'$. The second arcuate portion has a centre of curvature $M_{am}'$ and intermediate radius of curvature $R_m'$. The third portion has a centre of curvature $M_{ak}'$ and smallest radius of curvature $R_e'$. The centre of curvature $M_{am}'$ is positioned on the axis of rotation of the joint and on the offset line at an offset angle of $\alpha_O = 7°$ to 9° (in this case 8°). The illustrated groove line is designed to achieve a control angle of 0° when the joint is articulated to an angle of 50° in either direction. However, for reasons of avoiding a condition in which the joint tends to become jammed or self-inhibited against movement, up to an articulation angle of 10°, must not be less than 7° to 9°. Accordingly an offset angle for $R_m'$ is selected to be 8°, with an offset angle of 10° being selected for $R_w'$ and $R_e'$. As a result, the centres of curvature $M_{ag}'$ and $M_{ak}'$ are positioned on the points of intersection of the angle $\beta/2 = 25°$ and the offset angle $\alpha_O = 10°$. The shape of the groove, instead of comprising three distinct arcuate portions, may be replaced by a curve with continuous changes in curvature.

Figure 5:
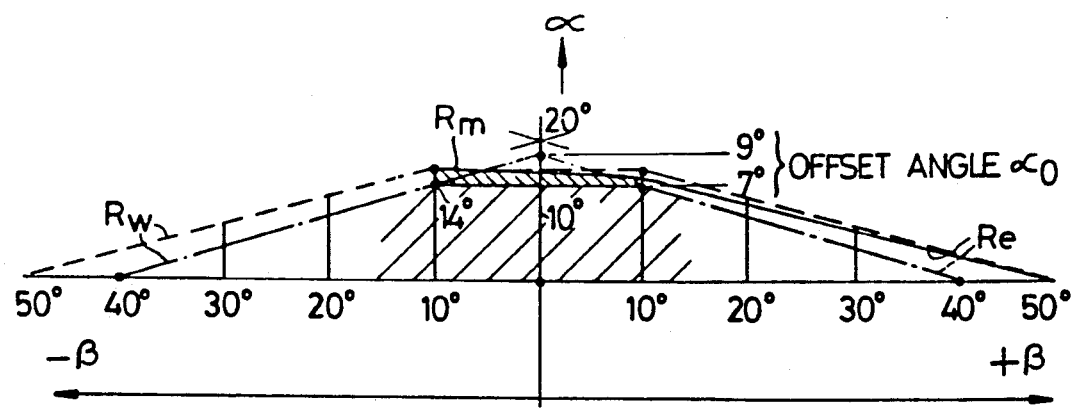
FIG. 5 illustrates how the control angle of a joint according to the invention varies as a function of joint articulation.

FIG. 5 shows diagrammatically how control angle $\alpha$ (ordinate) varies as a function of joint articulation $\beta$ (abscissa). A positive angle of articulation $\beta$ represents the conditions pertaining to the uppermost groove in a joint as shown in FIG. 2 of the drawings; a negative angle of articulation $\beta$ represents the opposite, lowermost, groove in the joint. The hatched part of the diagram shows the range between joint articulation angles of 10°, wherein the control angle is between 14° and 18° where the risk of self-inhibition occurs when the joint is articulated.

If the groove extends symmetrically on both sides, and if at a 40° angle of articulation the control angle reaches 0°, the control angle extension for the joint whose groove comprises two arcuate portions (shown in a chain-dotted line) requires an offset angle of at least 9° (in accordance with an 18° control angle) to avoid the range in which there is a risk of self-inhibition.

The change in control angle for the groove shape shown in FIG. 4 is shown in a dashed line. With its centre of curvature $M_{am}$ on the 8° offset line, and the centres of curvature $M_{ag}$ and $M_{ak}$ on the 10° offset line, the safety distance relative to the self-inhibition range is greater despite the smaller offset angle of 8°. Relative to the configuration represented by the chain-dotted line, the configuration represented by the dashed line has considerable advantages. A further improvement can be achieved by means of the continuously curved groove configuration shown, for the sake of clarity on the right hand side of the diagram only, as a continuous line.

We claim:
1. A non-plugging constant velocity ratio universal joint, comprising:
   an outer joint member provided in its interior with a plurality of circumferentially spaced grooves extending as meridians about the axis of rotation of the outer joint member;
   an inner joint member disposed inside the outer joint member and provided on its exterior with grooves extending as meridians about the axis of rotation of the inner joint member, facing the grooves in the outer joint member in pairs;

a plurality of balls disposed one in each facing pairs of grooves in the joint members for torque transmission therebetween;

a cage of annular form disposed between the inner and outer joint members and having windows wherein the balls are received, the balls being held by the cage with their centres in a plane;

the centre lines of the grooves of at least some of the pairs of facing grooves thereof each comprising at least two portions of different curvature as viewed in planes containing the axes of rotation of the joint members, with the centres of curvature of the centre lines of the outer member grooves of said pairs being positioned symmetrically relative to the centres of a related inner member grooves on opposite sides of a commonly held ball centre plane, the centres of the outer joint member being axially offset to the open end and the centres of the inner joint member being axially offset to the inner end of the outer joint member respectively,;

the tangents to the centre lines of the grooves of each of said at least some pairs at the engagement thereof by the ball received therein intersecting one another to define a control angle and the perpendicular lines to said tangents, in the aligned joint, extending to intersect the axis of the joint members to define offset lines each at an offset angle to the ball centre plane;

the centre lines of the grooves of said at least some pairs each comprising a portion of relatively smaller radius of curvature disposed at the side of the ball centre plane to which the respective offset line extends, and a portion of relatively larger radius of curvature than said portion of relatively smaller radius of curvature disposed at the side of the ball centre plane opposite that to which the respective offset line extends, the centre of curvature of the centre line of the groove portion of smaller radius of curvature being radially offset from the joint member axis towards the groove, and the centre of curvature of the portion of larger radius of curvature being radially offset from the joint member axis away from the groove.

2. A joint according to claim 1 wherein said smaller radius of curvature is smaller than the pitch circle radius of the balls in the aligned joint.

3. A joint according to claim 2 wherein said smaller radius of curvature is less than or equal to ⅔ of said pitch circle radius.

4. A joint according to claim 2 wherein said larger radius of curvature is greater than the pitch circle radius of the balls in the aligned joint.

5. A joint according to claim 4 wherein said larger radius of curvature is two to three times greater than said pitch circle radius.

6. A joint according to claim 1 wherein the centres of curvature of all said portions of the grooves lie on said offset lines of the respective joint member.

7. A joint according to claim 1 wherein the control angle of the joint, comprising the angle between the tangents to the centre lines of a pair of grooves at the engagement thereof by the ball received therein, for a groove pair whose centre lines lie in the articulation plane of the joint, is a maximum when the joint is in the aligned condition and decreases as the joint articulates.

8. A joint according to claim 7 wherein the control angle for said groove pair varies symmetrically as a function of the angle of articulation of the joint in opposite directions from the aligned condition.

9. A joint according to claim 7 wherein the control angle for said groove pair varies asymmetrically as a function of the angle of articulation of the joint in opposite directions from the aligned condition.

10. A joint according to claim 7 wherein the control angle becomes zero when the joint is articulated to an angle in excess of 20°.

11. A joint according to claim 1 wherein the depths of the grooves in the joint members are substantially the same as one another and constant along their lengths.

12. A joint according to claim 1 wherein the distance between the contact points of the balls and the edges of the grooves are substantially constant along the length of the grooves.

13. A joint according to claim 1 wherein the ratio of the thickness of the cage to the pitch circle diameter of the balls in the aligned joint is less than or equal to 1:18.

14. A joint according to claim 1 wherein each of said groove centre lines comprises two arcuate portions.

15. A joint according to claim 1 wherein each of said groove centre lines comprises three or more arcuate portions.

16. A joint according to claim 15 wherein the groove centre line includes a central portion, engaged by a ball up to a joint articulation angle of approximately 10° having a centre of curvature lying on the axis of the joint.

* * * * *